United States Patent
Bitner (10) Patent No.: US 7,918,907 B2
(45) Date of Patent: Apr. 5, 2011

(54) CLEANING NOZZLE FOR DUST COLLECTOR

(75) Inventor: Glenn W. Bitner, Alsip, IL (US)

(73) Assignee: Venturedyne, Ltd., Pewaukee, WI (US)

( * ) Notice: Subject to any disclaimer, the term of this patent is extended or adjusted under 35 U.S.C. 154(b) by 344 days.

(21) Appl. No.: 12/040,360

(22) Filed: Feb. 29, 2008

(65) Prior Publication Data

US 2009/0217630 A1    Sep. 3, 2009

(51) Int. Cl.
B01D 46/04    (2006.01)
(52) U.S. Cl. .......................................... 55/293; 55/302
(58) Field of Classification Search ............. 55/294; 95/280
See application file for complete search history.

(56) References Cited

U.S. PATENT DOCUMENTS

| | | |
|---|---|---|
| 3,436,899 A | 4/1969 | Pausch |
| 3,499,268 A | 3/1970 | Pausch |
| 3,798,878 A | 3/1974 | Pausch |
| 3,874,857 A | 4/1975 | Hunt et al. |
| 3,876,402 A | 4/1975 | Bundy et al. |
| 3,973,935 A | 8/1976 | Moore, Jr. et al. |
| 4,033,732 A | 7/1977 | Axelsson et al. |
| 4,077,781 A | 3/1978 | Sundstrom |
| 4,157,899 A | 6/1979 | Wheaton |
| 4,235,610 A | 11/1980 | Richard |
| 4,251,244 A | 2/1981 | Evenstad |
| 4,278,454 A | 7/1981 | Nemesi |
| 4,433,986 A | 2/1984 | Borst |
| 4,436,536 A | 3/1984 | Robinson |
| 4,544,382 A | 10/1985 | Taillet et al. |
| 4,578,092 A | 3/1986 | Klimczak |
| 4,666,472 A | 5/1987 | Klimczak et al. |
| 4,789,387 A | 12/1988 | Nemesi et al. |
| 4,910,047 A | 3/1990 | Barnett et al. |
| 4,955,996 A | 9/1990 | Edwards et al. |
| 5,002,594 A | 3/1991 | Merritt |
| 5,062,867 A | 11/1991 | Klimczak |
| 5,395,409 A | 3/1995 | Klimczak et al. |
| 5,549,734 A | 8/1996 | Standard |

(Continued)

OTHER PUBLICATIONS

Roberson, John A. and Crowe, Clayton T., "Engineering Fluid Mechanics" book, copyright 1975, pp. 505-507, Houghton Mifflin Company, USA.

*Primary Examiner* — Duane Smith
*Assistant Examiner* — Tiffany N Palmer
(74) *Attorney, Agent, or Firm* — Michael Best & Friedrich LLP (57) ABSTRACT

A particulate filtration device having a cleaning assembly including the cleaning nozzle that accelerates gas toward the downstream surface of the filter media. The cleaning nozzle comprises an inlet portion defining a converging inlet path, a throat portion defining a narrowest portion of the nozzle, and an outlet portion defining a diverging path and ending at an exit edge. The inlet portion, throat portion, and outlet portion collectively create an inner surface of the nozzle. The nozzle defines a centerline and an exit half angle relative to the centerline, and the exit half angle is about ten degrees. The nozzle has a throat area at the throat portion and an exit area at the exit edge. A ratio of the exit area to the throat area is about 1.4. A portion of the inlet portion adjacent the throat portion has a throat inlet radius, and a portion of the outlet portion adjacent the throat portion has a throat outlet radius. The throat outlet radius is larger than the throat inlet radius. For example, a ratio of the throat outlet radius to the throat inlet radius is about 2.9.

20 Claims, 5 Drawing Sheets

U.S. PATENT DOCUMENTS

| | | |
|---|---|---|
| 5,616,171 A | 4/1997 | Barris et al. |
| 6,022,388 A | 2/2000 | Andersson et al. |
| 6,149,716 A | 11/2000 | Bach et al. |
| 6,332,902 B1 | 12/2001 | Simonsen |
| 6,554,138 B1 | 4/2003 | Bihlet et al. |
| 6,786,946 B2 | 9/2004 | Jung |
| 6,902,592 B2 | 6/2005 | Green et al. |
| 2002/0100261 A1 | 8/2002 | Richard |
| 2003/0121238 A1 | 7/2003 | Richard |
| 2006/0075726 A1 | 4/2006 | Yoshimoto |

CLEANING NOZZLE FOR DUST COLLECTOR

BACKGROUND

The present invention generally relates to the field of particulate filtration assemblies and, more particularly, to nozzles for cleaning filters within such assemblies.

Particulate filtration assemblies function to remove contaminates from the air or other fluid medium. One type of particulate filtration assembly is a dust collector for filtering dust particles out of the air. Dust collectors mainly use a filter media, such as a filter bag, to trap dust particles and allow cleaned air to pass through the filter. Over time the trapped dust particles build up a dust cake on the upstream side (outside) of the filter media, greatly reducing the efficiency of the dust collector.

Dust collectors typically include a system for cleaning the filter media when it gets clogged with particulate. Such cleaning systems commonly are designed to shoot or force pressurized pulses of air into the opening of the filter media from downstream (inside) of the media. The air is often forced through a cleaning nozzle that accelerates the air to supersonic speeds prior to being forced toward the filter media. The cleaning air momentarily flows through and agitates the filter media by reversing the on coming fan air, resulting in particulate dislodging and falling into a particulate removal system, such as a hopper.

SUMMARY

The present invention relates to a particulate filtration device having a new cleaning nozzle configuration. The particulate filtration device includes a filter media having an upstream (dirty) surface and a downstream (clean) surface, an air moving device for moving air through the filter media from the upstream surface toward the downstream surface, and a cleaning assembly including the novel cleaning nozzle that accelerates gas toward the downstream surface of the filter media. The cleaning nozzle comprises an inlet portion defining a converging inlet path, a throat portion defining a narrowest portion of the nozzle, and an outlet portion defining a diverging path and ending at an exit edge. The inlet portion, throat portion, and outlet portion collectively create an inner surface of the nozzle. The nozzle defines a centerline and an exit half angle relative to the centerline, and the exit half angle is between about eight degrees and about thirteen degrees. Preferably, the exit half angle is between about nine degrees and about twelve degrees, and most preferably the exit half angle is about ten degrees.

In another aspect of the invention, the nozzle has a throat area at the throat portion and an exit area at the exit edge. A ratio of the exit area to the throat area is from about 1.4 to about 1.6. Preferably, the ratio is from about 1.4 to about 1.5, and most preferably, the ratio is about 1.4.

In yet another aspect, a portion of the inlet portion adjacent the throat portion has a throat inlet radius, and a portion of the outlet portion adjacent the throat portion has a throat outlet radius. The throat outlet radius is larger than the throat inlet radius. For example, a ratio of the throat outlet radius to the throat inlet radius can be at least about 1.2. Preferably, the ratio is at least about 1.8, more preferably at least about 2.5, and most preferably about 2.9.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
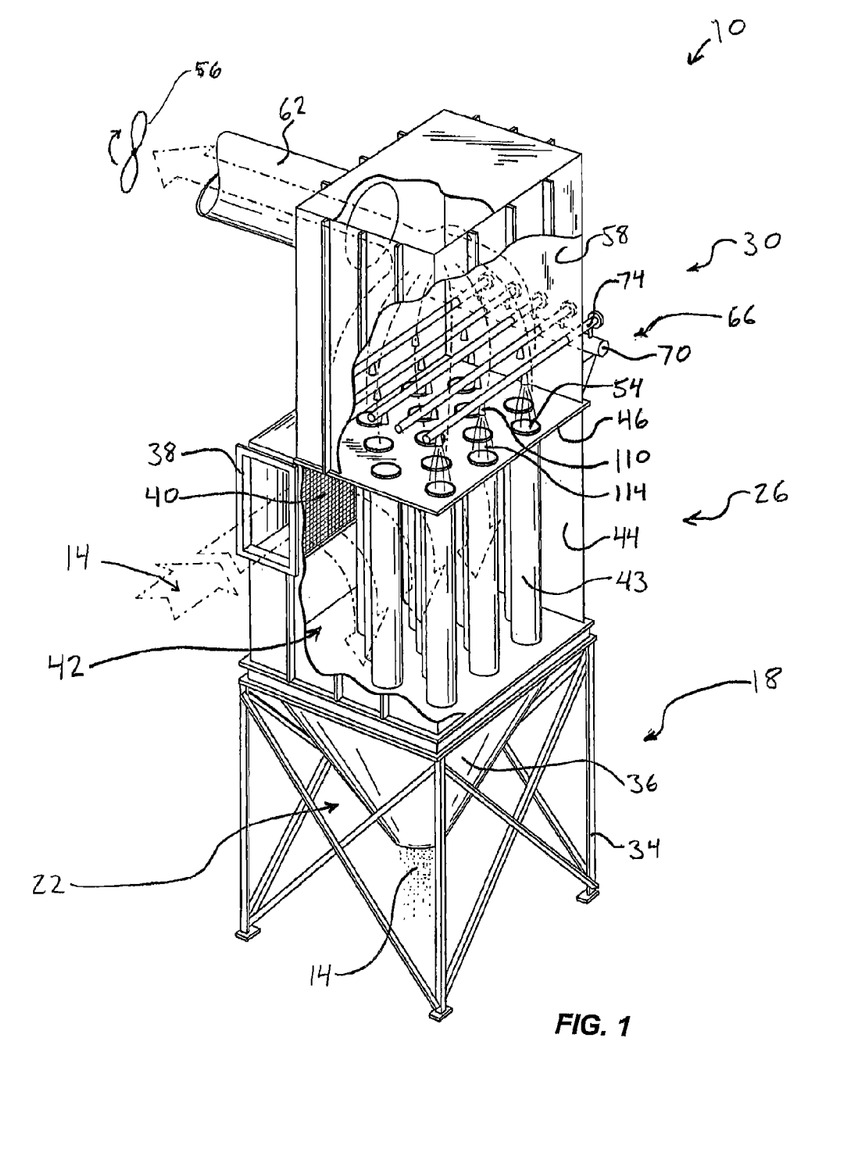
FIG. 1 is a cut-away perspective view of a particulate filtration device embodying the present invention.
Figure 2:
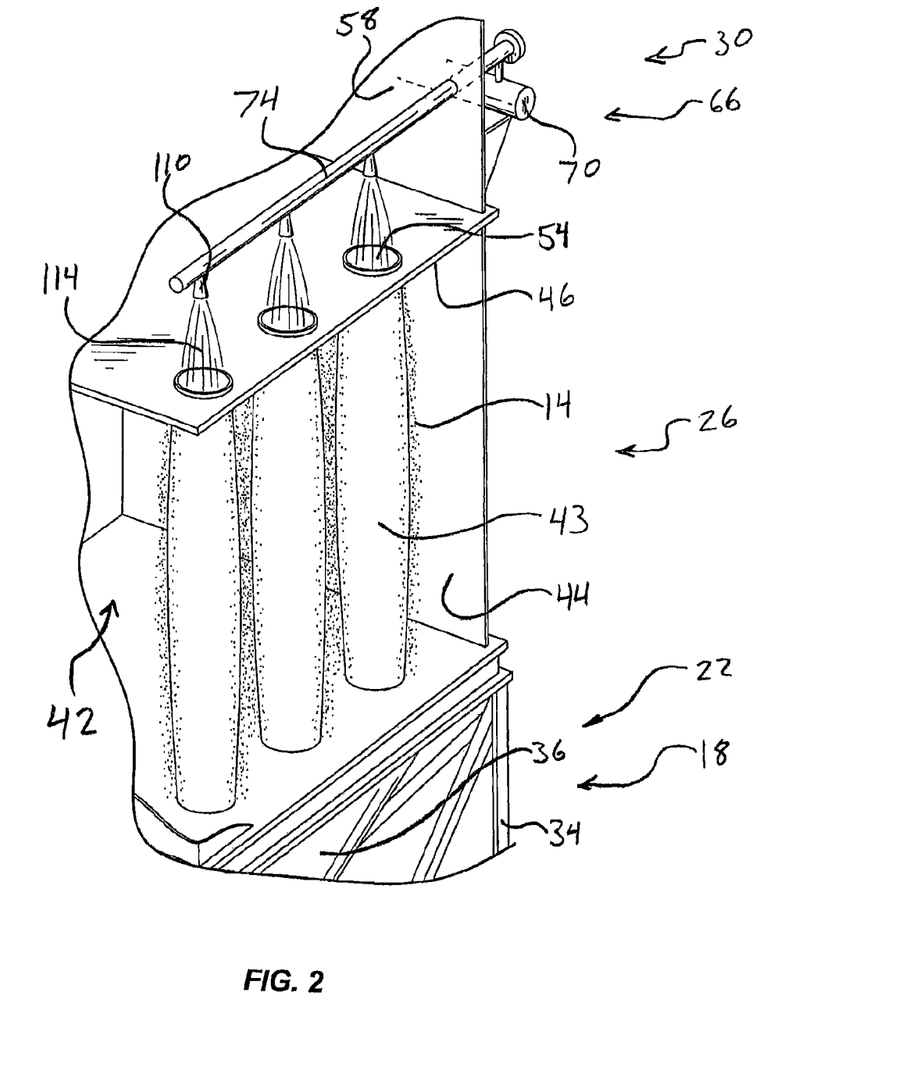
FIG. 2 is an enlarged partial view of the device of FIG. 1 during a cleaning operation.

FIGS. 1 and 2 illustrate a particulate filtration system, which in the preferred embodiment is a dust collector 10 designed to remove particulates 14, generally dust, from the air. The illustrated dust collector 10 includes a support assembly 18, a particulate removal assembly 22 positioned within the support assembly 18, a filtering assembly 26 positioned on top of the support assembly 18, and a cleaning assembly 30 positioned on top of the filtering assembly 26.

The illustrated support assembly 18 includes support members 34 that provide a rigid frame to which the remaining assemblies may be mounted. The illustrated support assembly 18 is generally square-shaped, and the support members 34 include four legs positioned at the four corners of the square and diagonal braces that provide extra rigidity to the frame. In other constructions, the support assembly 18 may be different shapes and may have more or less support members 34 of the same or different shape. In addition, more than four or less than four legs are conceivable.

The illustrated particulate removal assembly 22 is positioned within the support assembly 18 and is attached to the filter assembly 26 such that the particulate removal assembly 22 receives the particulates 14 that are removed from the air by the filter assembly 26. The particulate removal assembly 22 includes a door (not shown) and a hopper 36 with a generally conical shape that funnels the particulates 14 into a container (not shown). The door is positioned in the hopper 36 and is movable between an open position and a closed position. While in the closed position, the particulate removal assembly 22 inhibits air flow out of the particulate removal assembly 22 and collects the particulates 14 that are removed from the air by the filter assembly 26. In the open position, the particulate removal assembly 22 allows the collected particulates 14 to escape the hopper 36 and be emptied into a container for disposal. In other constructions, the particulate removal assembly may have other arrangements. For example, the hopper 36 may have a different profile and the door may be replaced with a powered louver. Other arrangements are also conceivable and are known by those skilled in the art.

The illustrated filter assembly 26 is positioned above the particulate removal assembly 22 and mounted on top of the support assembly 18. The filter assembly 26 includes an intake 38, a screen 40 covering the intake 38 and promoting an equal distribution of airflow in the filter and preventing large objects from entering the filter assembly 26, a classifier section 42, filter media 43 (e.g. filter bags), and a filter assembly enclosure 44, which includes four vertical walls, and a top 46, commonly referred to as a "tubesheet". The bottom of the filter assembly 26 is open to provide access to the particulate removal assembly 22 such that the particulates 14 collected in the filter assembly 26 are allowed to fall into the particulate removal assembly 22. The classifier section 42 is a space between the filter assembly enclosure 44 adjacent the screen 40 and the filter media 43 closest to the screen 40. The classifier section 42 is illustrated as an empty space and provides an area for larger particulates 14 to drop out of the air thereby reducing the load on the filter media 43. In addition, baffles could be added to the classifier section 42 to further remove particulates 14. The top 46 defines one or more openings 54 aligned with the filter media 43 and through which filtered air can flow out of the filter assembly 26 and into the cleaning assembly 30. To escape the filter assembly 26, the air must pass through the filter media 43 to gain access to the openings 54 and pass into the cleaning assembly 30. A fan 56 moves air through the dust collector 10. In other constructions, different filter media 43 may be used and the filter assembly may be arranged differently as is known by those skilled in the art. For example, the classifier section may have a different arrangement or may be removed.

The illustrated cleaning assembly 30 is positioned on top of the filter assembly 26 and includes a cleaning assembly enclosure 58, an exhaust 62, and an advanced cleaning system 66. The cleaning assembly enclosure 58 includes four vertical walls and a top. The illustrated exhaust 62 is attached to the side of the cleaning assembly enclosure 58 and directs cleaned air out of the dust collector 10. In other constructions, the exhaust 62 may be arranged differently and may be attached to a different side of the cleaning assembly enclosure 58.

As is best seen in FIG. 2, the advanced cleaning system 66 includes a primary distribution member 70, one or more secondary distribution members 74 attached to the primary distribution member 70, and one or more nozzles 110 coupled to the secondary distribution members 74. The primary distribution member 70 distributes bursts of pressurized air to the secondary distribution members 74, which in turn supply the nozzles 110 with bursts of pressurized air. As the pressurized air passes through the nozzles 110, it is directed into a stream of cleaning air 114 which is directed into the openings 54 and downward though the filter media 43. In other constructions, the advanced cleaning system 66 may be arranged differently. For example, the secondary distribution members 74 may be removed such that the nozzles 110 are attached to the primary distribution member 70. In addition, the shape and number of primary distribution members 70 and secondary distribution members 74 may be different.

In operation, air including particulates 14 enters the filtration assembly 26 of the dust collector 10 through the intake 38 where the screen 40 inhibits large particulates 14 from entering the filter assembly enclosure 44. Once inside the filter assembly enclosure 44 the air moves in a "downflow" air pattern toward the filter media 43. First, the air will pass through the classifier section 42 where more particulates 14 will drop out. After the classifier section 42, the air enters into contact with the filter media 43, and the remaining particulates 14 are trapped on the filter media 43 before the clean air exits through the openings 54 and enters the cleaning assembly 30 and exits the dust collector 10.

The filtering assembly 26 provides several advantages due to the "downflow" air pattern, the geometry of the openings 54, and other features not mentioned. The "downflow" air pattern guides the particulates 14 down to the bottom of the filter assembly 26 and into the particulate removal assembly 22. This causes more particulates 14 to fall out in the classifier section 42 and fewer particulates 14 to be deposited on the filter media 43. Due to the geometry of the openings 54, the particulates 14 that are trapped by the filter media 43 tend to build up a more even dust cake along the entire length of the filter media 43. This even dust cake promotes a better filtering efficiency and allows for more thorough cleaning with lower bag wear. In addition, the resulting dust cake produces a lower pressure drop between the filtering assembly 26 and the cleaning assembly 30 because there is no restriction (venturi) at the top of the bag opening. The lower pressure drop and higher filter efficiency allow the dust collector 10 to function at high efficiency and volume with significantly less filter media 43.

When a significant amount of particulate 14 covers the filter surface 32, the filter media 43 should be cleaned. During the cleaning operation (as is best seen in FIG. 2), the cleaning assembly 30 uses bursts of high velocity air to clean the filter media 43 thus increasing efficiency and prolonging the life of the filter media 43. In the illustrated embodiment, the cleaning assembly 30 directs bursts of high velocity air into the mouth of the filter media 43 through the opening 54. The high velocity air is slowed before entering the opening 54 by a pluming effect, such that the air reaches the mouth of the filter media 43 at ideal cleaning velocities. In one embodiment, the ideal cleaning velocity is between about one-hundred-fifty and two-hundred-fifty feet per second at the opening 54. In other embodiments, different velocities may be ideal as is known by those skilled in the art.

The illustrated dust collector 10 does not need to stop operation to perform a cleaning operation. The low pressure drop created between the filtering assembly 26 and the cleaning assembly 30 is easily overcome by the stream of cleaning air 114 even while the filtering assembly 26 is running. The cleaning operation forces high pressure air through the primary distribution member 70 where the high pressure air is distributed to the secondary distribution members 74, and forced thorough the nozzles 110 and directed into streams of cleaning air 114 that are directed into the mouth of the filter media 43 through the openings 54. The streams of cleaning air 114 are shot into the filter media 43 in bursts so as to rapidly inflate the filter media 43 and produce a shock or upset that causes the particulates 14 that are trapped on the filter media 43 to dislodge and fall to the filter assembly floor 50 and then down to the particulate removal assembly 22.

The nozzles 110 are high velocity supersonic nozzles designed to provide a greater volume of induced cleaning air and a more even bag inflation. The greater volume of induced cleaning air produces a larger stream of cleaning air 114 and increases cleaning potential. The even bag inflation allows the filter media 43 to be cleaned more thoroughly, with less shock to the filter media 43. This results in lower wear and longer life for the filter media 43.

Figure 3:
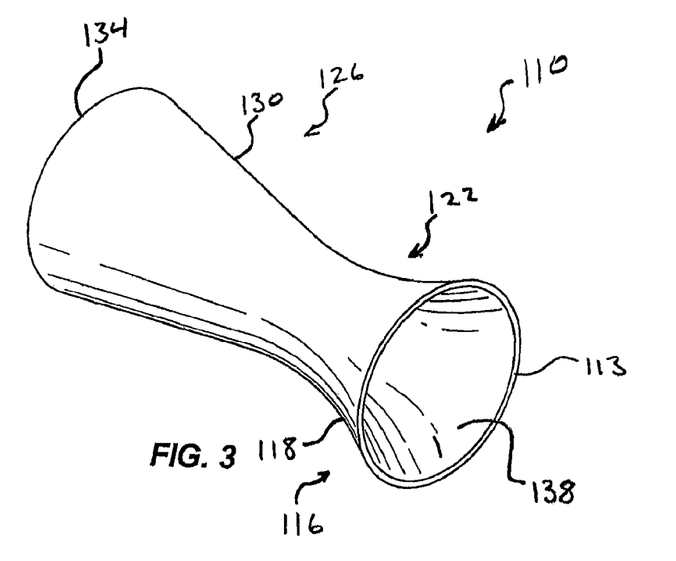
FIG. 3 is a perspective view of a nozzle used in the device of FIG. 1.

FIG. 3 illustrates a perspective view of the nozzle 110. The nozzle 110 is a converging-diverging nozzle that acts as a supersonic nozzle and produces a stream of cleaning air 114 moving at supersonic speeds. The nozzle 110 includes an inlet edge 113, an inlet portion 116 that defines a converging inlet path 118, a throat portion 122 defining a narrowest portion of the nozzle 110, an outlet portion 126 defining a diverging exit path 130, and an exit edge 134. The inlet portion 116, throat portion 122, and outlet portion 126 collectively define an inner surface 138 of the nozzle 110.

In operation, the illustrated nozzle 110 accepts high pressure air at the inlet edge 113 of the inlet portion 116 and accelerates it at subsonic speeds as the air travels along the converging inlet path 118. When the accelerating air reaches the throat portion 122 of the nozzle 110 the air reaches the speed of sound (mach one). After the throat portion 122, the air continues down the diverging exit path 130 where the air continues to accelerate to the exit edge 134 where the air exits the nozzle 110 supersonically and becomes the stream of cleaning air 114. The details of supersonic nozzles are well known by those skilled in the art and will not be discussed in further detail.

FIGS. 4-7 illustrate constructions of the nozzle 110 that include various features that have been found to provide favorable results when used with the advanced cleaning system 66. Various other arrangements of the advanced cleaning system 66 could also benefit from the invention. The illustrated advanced cleaning system 66 (see FIG. 2) should not be considered to limit the scope of the invention.

Figure 4:
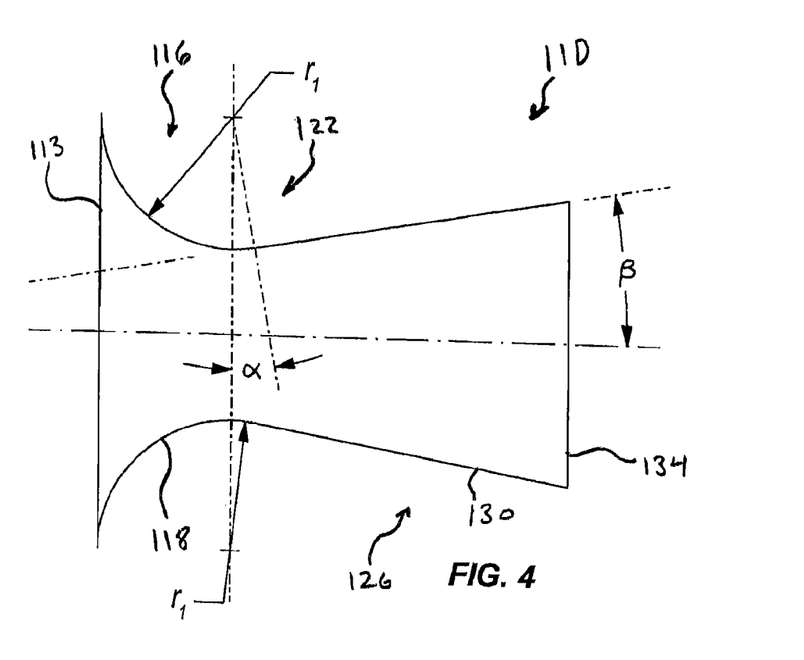
FIG. 4 is a profile of a first construction of a nozzle.

FIG. 4 illustrates a profile of a first construction of the nozzle 110. The inlet portion 116 of the nozzle 110 defines a converging inlet path 118 that has a radius $r_1$ that connects the inlet edge 113 and the throat portion 122 (shown as a vertical broken line). In the preferred construction, the radius $r_1$ is about 0.218 inches. After the throat portion 122 the outlet portion 126 defines a diverging exit path 130 that is constructed with the radius $r_1$ for an angle α of about ten degrees and then straightens out to form a straight diverging exit path 130 at an exit half angle β of about ten degrees with respect to the horizontal axis from the end of the radius $r_1$ to the exit edge 134. In other constructions, the radius $r_1$ may be more than about 0.218 inches or less than about 0.218 inches. In addition, the diverging exit path 130 may be formed at an exit half angle β between about 7.5 and 14 degrees.

Figure 5:
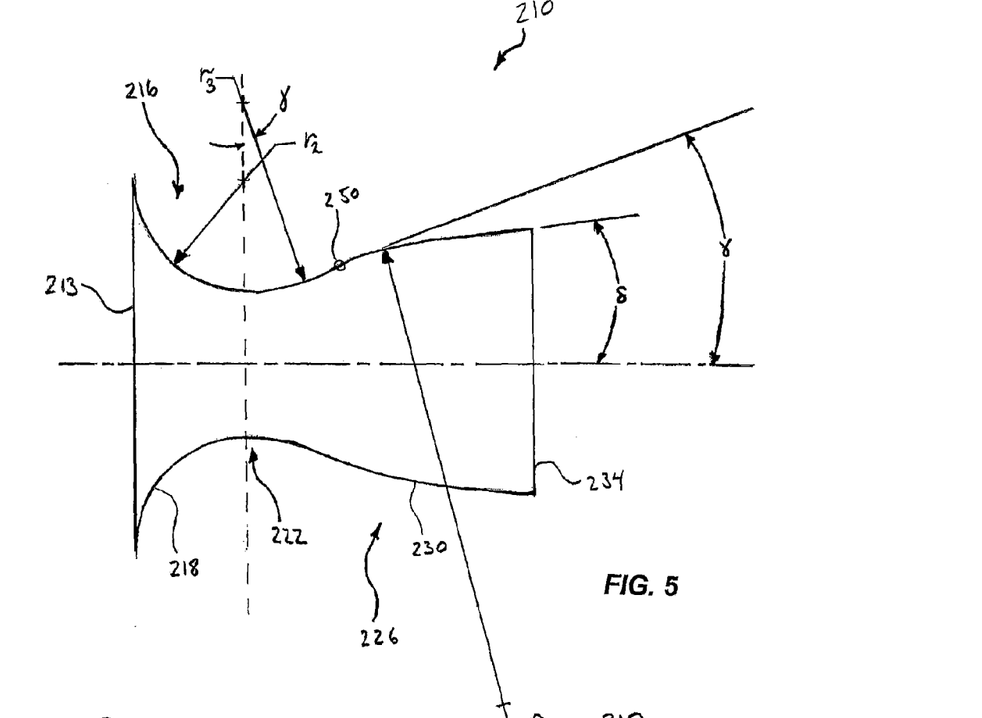
FIG. 5 is a profile of a second construction of a nozzle.

FIG. 5 illustrates a profile of another construction of a nozzle 210. The features of the nozzle 210 are similar to those of the nozzle 110 and are labeled with like numbers in the two hundred series. As such, these features will not be described. The inlet portion 216 of the nozzle 210 defines a converging inlet path 218 that has a converging radius $r_2$ that connects the inlet edge 213 and the throat portion 222 (shown as a vertical broken line). In the preferred construction, the radius $r_2$ is about 0.218 inches. After the throat portion 222 the outlet portion 226 defines a diverging exit path 230 that is constructed with a diverging radius $r_3$ that connects the throat portion 222 with an inflection point 250. The radius $r_3$ is continued until a tangent to the exit path 230 is at a half angle γ of about ten degrees. In the preferred construction, the radius $r_3$ is about 0.625 inches. In the construction described above with reference to FIG. 5, the ratio of the diverging radius $r_3$ to the converging radius $r_2$ is about 2.9. In addition, a tangent taken at the inflection point 250 between the radius $r_3$ and the radius $r_4$ forms the half angle γ of about ten degrees with respect to the horizontal. In other constructions, the half angle γ may be between about 7.5 degrees and about fourteen degrees.

After the inflection point 250, the diverging exit path follows another radius $r_4$ that ends at the exit edge 234 and a tangent taken at the exit edge 234 forms an exit half angle δ of about 7.5 degrees with the horizontal. In the preferred construction, the radius $r_4$ is about 2.740 inches. In other constructions, the radius $r_2$ may be more than the about 0.218 inches or less than about 0.218 inches, the radius $r_3$ may be more than about 0.625 inches or less than about 0.625 inches, and the radius $r_4$ may be more than about 2.740 inches or less than about 2.740 inches. In addition, the exit half angle δ may be between about zero degrees and about ten degrees with the preferred exit half angle δ of about 7.5 degrees with the horizontal.

Figure 6:
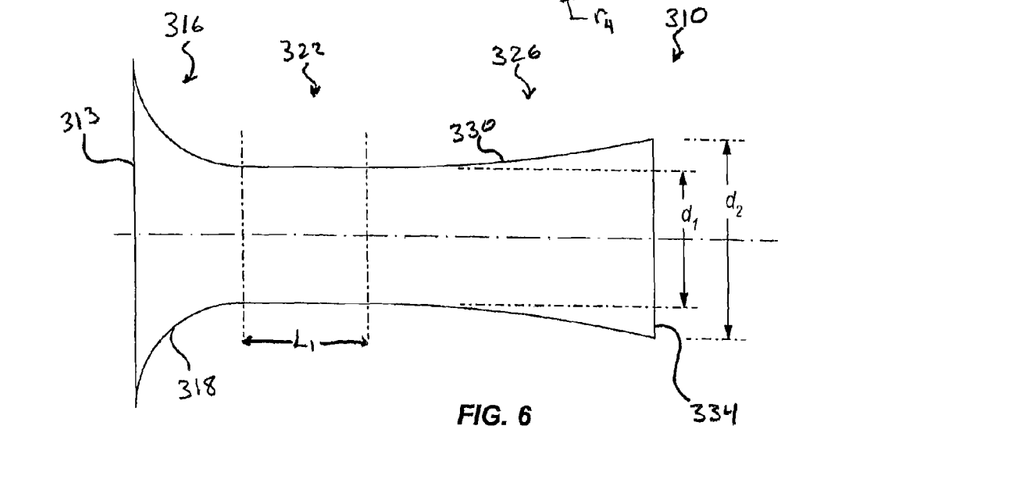
FIG. 6 is a profile of a third construction of a nozzle.

FIG. 6 illustrates a profile of a third construction of a nozzle 310. The features of the nozzle 310 are similar to those of the nozzle 110 and are labeled with like numbers in the three hundred series. As such, these features will not be described. The inlet portion 316 of the nozzle 310 follows a converging inlet path 318 to the throat portion 322. The throat portion 322 (shown between the vertical broken lines) has a first diameter $d_1$ and a length $L_1$. In the preferred construction, the first diameter $d_1$ is about 0.313 inches and the length $L_1$ is about 0.063 inches. After the throat portion 322 the outlet portion 326 defines a diverging exit path 330 that continues to the exit edge 334 that defines a second diameter $d_2$. In the preferred construction, the second diameter $d_2$ is about 0.375 inches. The first diameter $d_1$ defines a throat area $A_1$ and the second diameter $d_2$ defines an exit area $A_2$. The ratio of the exit area $A_2$ to the throat area $A_1$ is about 1.4. In other constructions, the first diameter $d_1$ and the second diameter $d_2$ may be different such that the ratio of the exit area $A_2$ to the throat area $A_1$ is between about 1.2 and 1.8.

Figure 7:
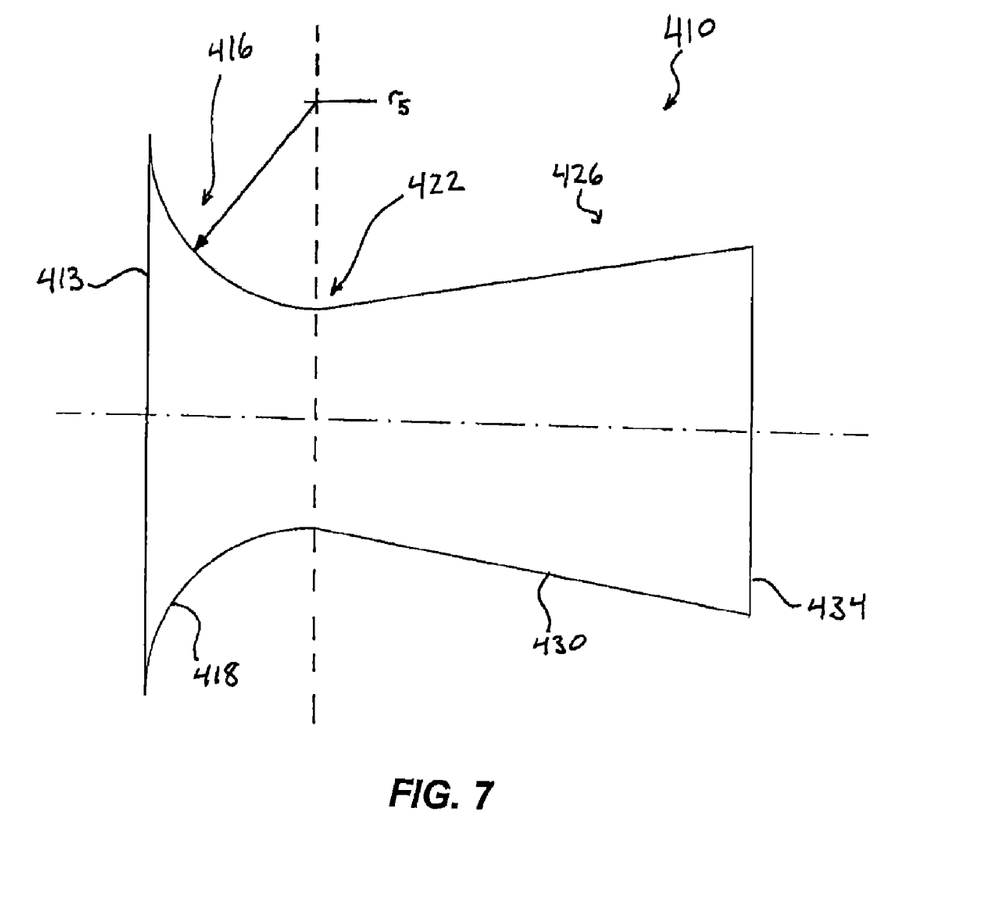
FIG. 7 is a profile of a fourth construction of a nozzle.

FIG. 7 illustrates a profile of a fourth construction of a nozzle 410. The features of the nozzle 410 are similar to those of the nozzle 110 and are labeled with like numbers in the four hundred series. As such, these features will not be described. The inlet portion 416 of the nozzle 410 follows a converging inlet path 418 that has a radius $r_5$ that connects the inlet edge 413 to the throat portion 422. In the preferred construction, the radius $r_5$ is about 0.190 inches. After the throat portion 422 the outlet portion 426 defines a straight diverging exit path 430 that continues to the exit edge 434. That is, there is no gradual transition from the radius $r_5$ of the converging inlet path 418 to the diverging exit path 430, but rather an abrupt transition. In other constructions, the radius $r_5$ may be more than about 0.190 inches or less than about 0.190 inches.

FIGS. 4-7 illustrate many features and combinations of features of the nozzle 110. It should be recognized that specific combinations of features that are not illustrated are still within the scope of the invention.

Thus, the invention provides, among other things, a nozzle for use in a particulate filtration assembly. Various features and advantages of the invention are set forth in the following claims.

What is claimed is:

1. A particulate filtration device comprising:
    a filter media having an upstream surface and a downstream surface;
    an air moving device for moving air through the filter media from the upstream surface toward the downstream surface; and
    a cleaning assembly including a cleaning nozzle that accelerates gas toward the downstream surface of the filter media, the cleaning nozzle comprising:
    an inlet portion defining a converging inlet path;
    a throat portion defining a narrowest portion of the nozzle and a throat area; and
    an outlet portion defining a diverging path and ending at an exit edge that defines an exit area, wherein a ratio of the exit area to the throat area is from about 1.4 to about 1.6, wherein the inlet portion, throat portion, and outlet portion collectively create an inner surface of the nozzle, wherein the nozzle defines a centerline and an exit half angle relative to the centerline, and wherein the exit half angle is between about 10 degrees and about 13 degrees.

2. A particulate filtration device as claimed in claim 1, wherein the exit half angle is about 10 degrees.

3. A particulate filtration device as claimed in claim 1, wherein the exit half angle is the angle between the centerline and a line passing through the exit edge and a tangent to the inner surface of the nozzle.

4. A particulate filtration device as claimed in claim 1, wherein a portion of the inlet portion adjacent the throat portion has a throat inlet radius, wherein a portion of the outlet portion adjacent the throat portion has a throat outlet radius, and wherein the throat outlet radius is larger than the throat inlet radius.

5. A cleaning nozzle for a dust collector comprising:
an inlet portion defining a converging inlet path;
a throat portion defining a narrowest portion of the nozzle; and
an outlet portion defining a diverging path, wherein a portion of the inlet portion adjacent the throat portion has a throat inlet radius, wherein a portion of the outlet portion adjacent the throat portion has a throat outlet radius, wherein the throat outlet radius is larger than the throat inlet radius, and wherein a ratio of the throat outlet radius to the throat inlet radius is at least about 1.2.

6. A cleaning nozzle as claimed in claim 5, wherein a ratio of the throat outlet radius to the throat inlet radius is at least about 1.8.

7. A cleaning nozzle as claimed in claim 5, wherein a ratio of the throat outlet radius to the throat inlet radius is at least about 2.5.

8. A cleaning nozzle as claimed in claim 5, wherein a ratio of the throat outlet radius to the throat inlet radius is about 2.9.

9. A cleaning nozzle as claimed in claim 5, wherein the throat portion defines a throat area, wherein the outlet portion ends at an exit edge defining an exit area, and wherein a ratio of the exit area to the throat area is from about 1.4 to about 1.6.

10. A cleaning nozzle as claimed in claim 9, wherein the ratio is from about 1.4 to about 1.5.

11. A cleaning nozzle as claimed in claim 9, wherein the ratio is about 1.4.

12. A cleaning nozzle as claimed in claim 9, wherein a portion of the inlet portion adjacent the throat portion has a throat inlet radius, wherein a portion of the outlet portion adjacent the throat portion has a throat outlet radius, and wherein the throat outlet radius is larger than the throat inlet radius.

13. A cleaning nozzle for a dust collector comprising:
an inlet portion defining a converging inlet path;
a throat portion defining a narrowest portion of the nozzle and a throat area;
an outlet portion defining a diverging path, wherein a portion of the inlet portion adjacent the throat portion has a throat inlet radius, wherein a portion of the outlet portion adjacent the throat portion has a throat outlet radius, wherein the throat outlet radius is larger than the throat inlet radius, and wherein the outlet portion ends at an exit edge defining an exit area, and wherein a ratio of the exit area to the throat area is from about 1.4 to about 1.6.

14. A cleaning nozzle as claimed in claim 13, wherein a ratio of the throat outlet radius to the throat inlet radius is at least about 1.2.

15. A cleaning nozzle as claimed in claim 13, wherein a ratio of the throat outlet radius to the throat inlet radius is at least about 1.8.

16. A cleaning nozzle as claimed in claim 13, wherein a ratio of the throat outlet radius to the throat inlet radius is at least about 2.5.

17. A cleaning nozzle as claimed in claim 13, wherein a ratio of the throat outlet radius to the throat inlet radius is about 2.9.

18. A cleaning nozzle as claimed in claim 13, wherein the ratio is from about 1.4 to about 1.5.

19. A cleaning nozzle as claimed in claim 13, wherein the ratio is about 1.4.

20. A cleaning nozzle as claimed in claim 13, wherein the nozzle defines a centerline and an exit half angle relative to the centerline, and wherein the exit half angle is between about 10 degrees and about 13 degrees.

* * * * *